(12) United States Patent
Jackson

(10) Patent No.: US 11,760,696 B2
(45) Date of Patent: Sep. 19, 2023

(54) CERAMIC MATRIX COMPOSITE COMPONENT WITH MODIFIED THERMAL EXPANSION AND METHOD FOR PRODUCING THE SAME

(71) Applicant: United Technologies Corporation, Farmington, CT (US)

(72) Inventor: Richard Wesley Jackson, Groton, CT (US)

(73) Assignee: RTX CORPORATION, Farmington, CT (US)

( * ) Notice: Subject to any disclaimer, the term of this patent is extended or adjusted under 35 U.S.C. 154(b) by 619 days.

(21) Appl. No.: 16/240,062

(22) Filed: Jan. 4, 2019

(65) Prior Publication Data
US 2020/0216365 A1 Jul. 9, 2020

(51) Int. Cl.
*C04B 35/80* (2006.01)

(52) U.S. Cl.
CPC ...... *C04B 35/80* (2013.01); *C04B 2235/9607* (2013.01)

(58) Field of Classification Search
CPC ............ C04B 35/80; C04B 2235/9607; C23C 28/345
USPC ........................................................ 428/688
See application file for complete search history.

(56) References Cited

U.S. PATENT DOCUMENTS

| | | | |
|---|---|---|---|
| 5,292,692 A | 3/1994 | Maloney et al. | |
| 6,444,335 B1 | 9/2002 | Wang et al. | |
| 6,610,370 B2 | 8/2003 | Wang et al. | |
| 6,617,037 B2 | 9/2003 | Sun et al. | |
| 6,740,364 B2 | 5/2004 | Lau et al. | |
| 6,902,836 B2 | 6/2005 | Eaton et al. | |
| 7,357,994 B2 | 4/2008 | Hazel et al. | |
| 7,449,254 B2 | 11/2008 | Spitsberg et al. | |
| 7,638,178 B2 | 12/2009 | Raybould et al. | |

(Continued)

FOREIGN PATENT DOCUMENTS

EP 0798280 B1 9/2001

OTHER PUBLICATIONS

"Mechanisms of Ytterbium Monosilicate/Mullite/Silicon Coating Failure During Thermal Cycling in Water Vapor", Bradley T. Richards, Matthew R. Begley, Haydn N.G. Wadley, Journal of the American Ceramic Society, 1-10 (2015), DOI: 10.1111/jace.13792.

(Continued)

*Primary Examiner* — Humera N. Sheikh
*Assistant Examiner* — Katherine A Christy
(74) *Attorney, Agent, or Firm* — Getz Balich LLC

(57) ABSTRACT

A ceramic matrix composite (CMC) material component is provided that includes a CMC material and an environmental barrier coating (EBC). The CMC material includes first fibers, a matrix, and at least one coefficient of thermal expansion (CTE) increasing additive. The first fibers include a first material having a first CTE value. The matrix includes a second material having a second CTE value. The at least one CTE increasing additive has a third CTE value. The EBC is disposed on at least one exposed surface of the CMC material and has a fourth CTE value. The third CTE value is greater than the first CTE value and the second CTE value, and the at least one CTE increasing additive is present within the CMC material in an amount that elevates a CTE value of the CMC material above the first CTE value or the second CTE value.

5 Claims, 1 Drawing Sheet

(56) References Cited

U.S. PATENT DOCUMENTS

2010/0255289 A1* 10/2010 Lewinsohn ............. C04B 41/52
                                                    428/325
2013/0167374 A1*  7/2013 Kirby ..................... B32B 18/00
                                                    29/888.02
2014/0261080 A1*  9/2014 Lee ........................ C04B 41/52
                                                    106/286.5
2017/0313629 A1* 11/2017 Shim .................. C04B 35/5607

OTHER PUBLICATIONS

"Thermal Gradient Cyclic Behavior of a Thermal/Environmental Barrier Coating System on SiC/SiC Ceramic Matrix Composites", Dongming Zhu, Kang N. Lee, Robert A. Miller, Technical Memorandum prepared for the Proceedings of ASME Turbo Expo 2002, Jun. 3-6, 2002—Amsterdam, The Netherlands.

Lee et al. "Cfiber/SiCfiller/Si—B—C—Nmatrix Composites with Extremely High Thermal Stability", ACTA Materialia, vol. 57, No. 15, Sep. 2009, pp. 4374-4381.

Padmavathi et al. "Synthesis of Carbon Fibre-Reinforced, Silicon Carbide Composites by Soft-Solution Approach", Academy Proceedings in Engineering Sciences, vol. 37, No. 4, Sep. 11, 2012, pp. 493-502.

EP search report for EP20150356.2 dated May 12, 2020.

Office Action for EP20150356.2 dated Jan. 26, 2023.

\* cited by examiner

CERAMIC MATRIX COMPOSITE COMPONENT WITH MODIFIED THERMAL EXPANSION AND METHOD FOR PRODUCING THE SAME

BACKGROUND OF THE INVENTION

1. Technical Field

The present disclosure relates to methods for producing ceramic matrix composites ("CMCs") in general, and CMCs with modified thermal expansion characteristics in particular.

2. Background Information

Ceramic matrix composites ("CMC") material may be utilized to form a variety of different components, and have particular utility in high temperature environments such as within a gas turbine engine.

The low density and high temperature operating capabilities of CMC materials can be advantageous in many applications, including but not limited to applications within gas turbine engines. Some CMCs, however, are susceptible to degradation (e.g., oxidation, etc.) in high temperature environments; e.g., an environment such as that found in a combustor section and/or turbine section of a gas turbine engine. In order to protect the CMC, it is known to apply an environment barrier coating ("EBC") to the exposed surfaces of the CMC component. In some instances, the durability of an EBC applied to a CMC component may be affected by differences in the coefficient of thermal expansion ("CTE") between the EBC coating and the CMC substrate to which it is applied. If the differences in the CTE of the EBC coating and the CTE of the CMC substrate are great enough, and the coated substrate is heated to a sufficient temperature, the aforesaid CTE difference can result in mechanical deficit (e.g., cracks, etc.) in the EBC coating. The aforesaid mechanical deficit can negatively affect the durability of the EBC coating. Silicon carbide ("SiC"), for example, is often present within a CMC, and SiC often has a lower CTE than many EBCs. Hence, there may be a CTE disparity there between that negatively affects the durability of the CMC component. Indeed, in some instances, if there is a substantial CTE disparity or mismatch between the CTE of a CMC material and the CTE of an EBC coating, a person of skill in the art will recognize that the aforesaid EBC coating may not be considered as a viable EBC candidate for the CMC material for a given application. As a result, in some applications there may be a limited number of EBC coating materials available for use with a given CMC material, and consequently that particular CMC material (and similar CMCs) may not be a viable candidate for certain component applications.

The problem caused by CTE mismatch is known in the prior art; e.g., the failure of $ZrO2-Y_2O_3$ EBCs due to the high CTE of the $ZrO_2$—$Y_2O_3$ mismatched with SiC/SiC CMCs, resulting in cracking. (See Zhu, D., Lee, K. N. and Miller, R. A., 2002, January; "Thermal gradient cyclic behavior of a thermal/environmental barrier coating system on SiC/SiC ceramic matrix composites"; *ASME Turbo Expo 2002: Power for Land, Sea, and Air* (pp. 171-178), American Society of Mechanical Engineers). As another example, the prior art discloses cracking of an EBC comprising ytterbium monosilicate ($Yb_2SiO_5$) due to a CTE mismatch with SiC. (See Richards, Bradley T., Matthew R. Begley, and Haydn N G Wadley, "Mechanisms of ytterbium mono-silicate/mullite/silicon coating failure during thermal cycling in water vapor." *Journal of the American Ceramic Society* 98, no. 12 (2015): 4066-4075)

What is needed, therefore, is a CMC that has an improved ability to be protected by one or more different types of EBC coatings.

SUMMARY

A ceramic matrix composite (CMC) material component is provided that includes a CMC material and an environmental barrier coating (EBC). The CMC material includes a plurality of first fibers, a matrix, and at least one coefficient of thermal expansion (CTE) increasing additive. The plurality of first fibers includes a first material having a first CTE value. The matrix is incorporated with the plurality of fibers. The matrix includes a second material having a second CTE value. The at least one CTE increasing additive has a third CTE value. The EBC is disposed on at least one exposed surface of the CMC material. The EBC has a fourth CTE value. The third CTE value is greater than the first CTE value and the second CTE value, and the at least one CTE increasing additive is present within the CMC material in an amount that elevates a CTE value of the CMC material above the first CTE value or the second CTE value.

According to another aspect of the present disclosure, a method of producing a ceramic matrix material (CMC) component is provided. The method includes producing a CMC material, including: a) providing a plurality of first fibers comprising a first material, the first material having a first coefficient of thermal expansion (CTE) value; b) incorporating a matrix with the plurality of first fibers, the matrix comprising a second material having a second CTE value; and c) incorporating at least one CTE increasing additive having a third CTE value; and disposing an environmental barrier coating (EBC) on at least one exposed surface of the CMC material, the EBC having a fourth CTE value. The third CTE value is greater than the first CTE value and the second CTE value, and the CTE increasing additive is present within the CMC in an amount that elevates a CTE value of the CMC above the first CTE value or the second CTE value.

In any of the aspects or embodiments described above and herein, at least one CTE increasing additive may be incorporated into the plurality of fibers.

In any of the aspects or embodiments described above and herein, at least one CTE increasing additive may be provided as fibers, and the CTE increasing additive fibers may be incorporated with the first fibers to produce a plurality of fiber tows and are incorporated into the CMC.

In any of the aspects or embodiments described above and herein, at least one CTE increasing additive fibers may be a first CTE increasing additive, and the at least one CTE increasing additive may include a second CTE increasing additive that is incorporated into the matrix.

In any of the aspects or embodiments described above and herein, the second CTE increasing additive may be incorporated into the matrix in particulate form.

In any of the aspects or embodiments described above and herein, the at least one CTE increasing additive may be incorporated into the matrix.

In any of the aspects or embodiments described above and herein, the first CTE increasing additive may be incorporated into the matrix in particulate form.

In any of the aspects or embodiments described above and herein, at least one CTE increasing additive may include a first CTE increasing additive in particulate form and a second CTE increasing additive in fiber form.

In any of the aspects or embodiments described above and herein, the first material and the second material may be the same materials, and the first CTE value equals the second CTE value.

In any of the aspects or embodiments described above and herein, the first material may be SiC, the at least one CTE increasing additive may include at least one of $Al_2O_3$, $ZrO_2$—$Y_2O_3$, or $MoSi_2$, and the EBC may be a rare-earth monosilicate.

In any of the aspects or embodiments described above or herein, the fourth CTE value and the CTE value of the CMC material may be sufficiently close to one another such that the EBC is thermo-mechanically stable on the at least one exposed surface of the CMC material.

In any of the aspects or embodiments described above or herein, the fourth CTE value may be equal to or greater than the CTE value of the CMC material.

DETAILED DESCRIPTION

The present disclosure is directed to methods of increasing the coefficient of thermal expansion (CTE) of a ceramic matrix composite ("CMC") relative to an environmental barrier coating ("EBC") applied to a surface of a substrate formed of the CMC material, and to CMC substrates or components having a CTE modified to more closely match the CTE of a respective EBC coating. A component or substrate formed with a modified CMC material according to the present disclosure (referred to hereinafter collectively as a "CMC component") may have particular utility in high temperature applications (e.g., a gas turbine engine), but the present disclosure is not limited to a CMC component designed for any particular application.

Figure 1:
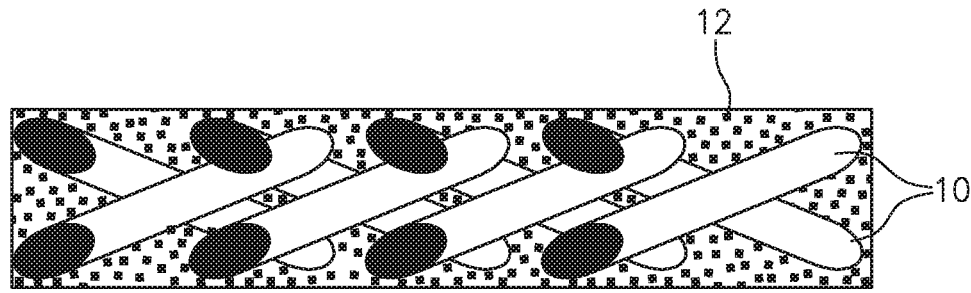
FIG. 1 is a diagrammatic representation of a ceramic matrix composite preform.

Referring to FIG. 1, the manufacture of a CMC component typically begins with the production of a preform. The CMC preform may include fibers 10, but is not limited thereto. The fibers 10 may include discontinuous fibers, continuous fibers, or some combination thereof. Each fiber 10 may be a fiber tow comprising a substantial number of filaments. The fibers 10 may be grouped into discrete bundles. Within a CMC preform, the fiber or fiber bundles (hereinafter collectively referred to as the "fibers 10") may be twisted or untwisted, and may be arranged in woven, non-woven, braided, knitted or other known fiber architectures. The CMC preform further includes a matrix 12 within which the fibers 10 reside.

The present disclosure is not limited to any particular manner of combining the fibers 10 and matrix 12 materials. As a non-limiting example, a fiber architecture may be infiltrated with one or more particulate materials disposed within a liquid carrier; e.g., a slurry. The liquid mixture is applied to the fiber architecture in a manner that allows for infiltration. The liquid carrier may be subsequently removed, leaving a deposit of the one or more particulate materials within the preform. As will be discussed below, additional and/or different infiltration steps may be utilized to deposit additional materials in the formation of the matrix. Other than inclusion of one or more aspects described herein, the present disclosure is not limited to any particular methodology for forming a CMC preform and the CMC component produced therefrom.

Figure 2:
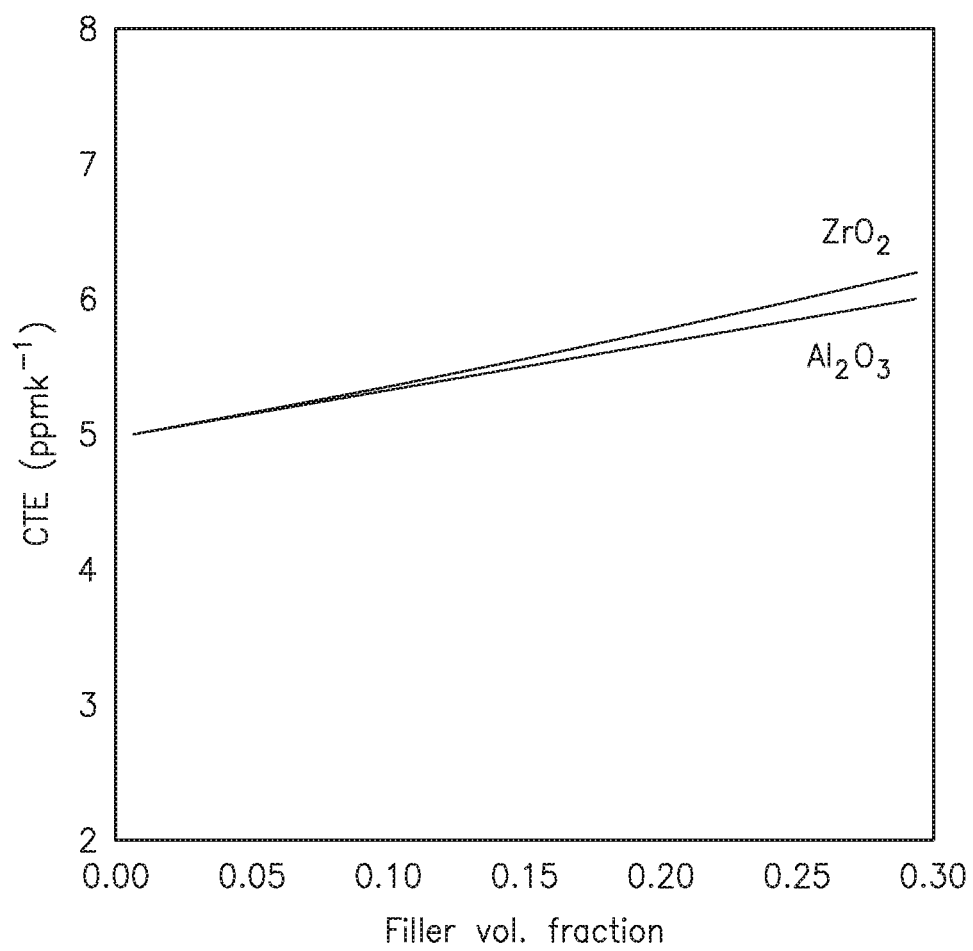
FIG. 2 is a graph illustrating CTE values on the vertical axis, and matrix filler volume fraction on the horizontal axis.

According to the present disclosure, a CMC material is modified with one or more CTE increasing additives that change the CMC material into a modified CMC material having a CTE value that is greater than the CTE value of the original CMC material. The graph shown in FIG. 2, for example, illustrates the effect of adding zirconium oxide ("$ZrO_2$") as a CTE increasing additive, or the effect of adding aluminum oxide ("$Al_2O_3$") as a CTE increasing additive. The graph shown in FIG. 2 includes CTE values (in units of $ppmK^{-1}$) on the vertical axis, and matrix filler volume fraction on the horizontal axis. For description sake, it may be assumed that the original CMC material has a first CTE value ("CTE1"), the modified CMC material has a second CTE value ("CTE2"), and an EBC coating that is for application to an exposed surface of a CMC component has a third CTE value ("CTE3"), wherein CTE1<CTE2≤CTE3. CTE values, as used herein, may be described in terms of thermal expansion per degree temperature. For example, CTE values may be expressed in units of "ppm/K" or "$ppmK^{-1}$", wherein the thermal expansion is identified in terms of "parts per million" or "ppm", and the temperature is identified in terms of degrees Kelvin. Other units representing thermal expansion and temperature may be used alternatively; e.g., "ppm/C", "ppm/F", etc.

The one or more CTE increasing additives that are added to the original CMC material to form the modified CMC material, are added in a quantity that is adequate to produce a modified CMC material with a CTE value (e.g., CTE2) that is sufficiently close to the CTE value of the EBC coating (e.g., CTE3), such that the EBC coating bonded to the modified CMC material (e.g., bonded to a surface of a component comprising the modified CMC material) is thermo-mechanically stable on the modified CMC material within a given set of environmental parameters. The term "thermo-mechanically stable" is used herein to describe applications wherein the EBC coating on the modified CMC material acquires no more than an acceptable amount of mechanical deficit (e.g., cracks, etc.) under predetermined environmental conditions (e.g., temperature, etc.) for a predetermined period of time; e.g., the application parameters of a component comprising the modified CMC material. In other words, the amount of thermally induced cracking within the EBC coating, if any, is less than an amount that would prevent the modified CMC material component from being used in the aforesaid environmental conditions for the predetermined period of time.

In embodiments of the present disclosure, a modified CMC material is provided that has a CTE value that is substantially equal to the CTE value of the EBC coating that is to be applied to a component comprising the modified CMC material for a given set of environmental parameters. The relative equality between the modified CMC CTE value and the EBC CTE value for the given operating parameters may substantially decrease or eliminate mechanical deficit (e.g., cracks, etc.) that may be induced by thermal stress. In some instances, a CMC material modified according to the present disclosure may make it possible to utilize an EBC coating that would not have been acceptable for use with the CMC material in unmodified form for a given set of environmental parameters.

Each CTE increasing additive should be thermodynamically stable with the other materials that are present within the unmodified CMC material. In preferred embodiments, the CTE increasing additive should also possess acceptable thermal conductivity, creep resistance, and toughness.

Each CTE increasing additive (which may also be referred to as "second phase material") typically has a CTE value that is higher than the CTE value of other materials within an unmodified version of the CMC material. The addition of the one or more CTE increasing additives therefore modifies the CMC material to have a higher CTE value than it would otherwise. Each CTE increasing additive also typically has a CTE value that does not substantially exceed the CTE value of other materials within an unmodified version of the CMC material. In other words, the one or more CTE increasing additives do not possess a CTE value so high relative to the CTE value of the unmodified CMC material (e.g., the constituents therein) that the disparity between the aforesaid CTE values would create stress under operating parameters that could result in mechanical deficit. As an example, if the unmodified CMC material is a SiC composition (which has a CTE value of approximately 5 ppmK$^{-1}$), the one or more CTE increasing additives should each have a CTE value of at least about five ppmK$^{-1}$ (~5 ppmK$^{-1}$), and should each have a CTE value of no more than about fifteen ppmK$^{-1}$ (~15 ppmK$^{-1}$). These CTE values are non-limiting examples intended to illustrate relationship of CTE values, and the present disclosure is not limited thereto.

A CTE increasing material may be incorporated into a CMC material to produce a modified CMC material in a variety of different ways, or combinations thereof. For example, in some embodiments a CTE increasing additive may be incorporated into or added to the filaments that are used to form a fiber used in the CMC material. As another example, in some embodiments a CTE increasing additive may be incorporated into or added to the fibers that are used to form a fiber bundle used in the CMC material, or incorporated into or added to the bundle itself. As another example, in some embodiments a CTE increasing additive may be incorporated into or added to the fibers or fiber bundles subsequent to those fibers or fiber bundles being formed into a fiber architecture. As another example, in some embodiments a CTE increasing additive may be incorporated into or added to the matrix portion of the CMC material. In some embodiments, including one or more of those described heretofore, a CTE increasing additive may be incorporated into or added to a CMC preform (or portions thereof) by a deposition process such as chemical vapor infiltration ("CVI"), or atomic layer deposition ("ALD"), or the like. The inclusion of a CTE additive increasing additive may be performed in multiple process steps, which process steps are similar or different.

The present disclosure may be utilized with a variety of different types of CMC materials; e.g. Carbon ("C") fiber/C matrix, C fiber/SiC matrix, SiC fiber/Carbon matrix, SiC fiber/SiC matrix, Al$_2$O$_3$/Al$_2$O$_3$, etc. The present disclosure is not limited to any particular CMC material, although it has particular utility for SiC based CMC materials due to the typical CTE value disparity between SiC based materials and EBC coating materials desirable for use in high temperature applications. The non-limiting examples provided in Table 1 below illustrate SiC based CMC materials with one or more CTE increasing additives included to provide a modified CMC material with a higher CTE (all percentages on volume % basis of the CMC material).

TABLE 1

| Example No. | CMC fiber | CMC Matrix material | CTE increasing additive |
| --- | --- | --- | --- |
| 1 | 40% SiC fibers | 30% SiC matrix | 30% Al$_2$O$_3$ particles |
| 2 | 30% SiC fibers | 40% SiC matrix | 20% Al$_2$O$_3$ particles 10% Al$_2$O$_3$ fibers |
| 3 | 40% SiC fibers | 40% SiC matrix | 20% c-ZrO—10Y2O3 particles |
| 4 | 30% SiC fibers | 40% SiC matrix | 10% Al$_2$O$_3$ fibers 20% c-ZrO—10Y2O3 particles |
| 5 | 30% SiC fibers | 40% SiC matrix | 10% MoSi$_2$ fibers 20% Al$_2$O$_3$ particles |

The following examples are provided as non-limiting examples to illustrate the utility of the present disclosure.

Example 1

SiC fibers (e.g., Hi-Nicalon Type S provided by NGS Advanced Fibers Co., Ltd.) may be used to create fiber tows. The specific number of fibers in a tow may vary depending on characteristics of the desired tow and/or characteristics of the CMC component being produced. As an example, a number of SiC fibers (e.g., 500) may be aligned parallel to create each tow. The fiber tows may be woven into plies, and a collection of the plies may then be shaped into a skeletal preform of a component. The SiC fibers only fill a portion of the skeletal preform (e.g., about 40% of the preform volume), thereby leaving a remainder of the skeletal preform (e.g., about 60%) as void space within the perimeter of the preform. The skeletal preform of fibers may then be coated with a thin interface coating; e.g., an initial layer of boron nitride (e.g., 500 nm thick), and a subsequent coating of SiC (e.g., 1500 nm thick). An example of a process that can be used to form the coating(s) is a chemical vapor deposition ("CVD") process, but the present disclosure is not limited thereto. Subsequent to the coatings being applied, an aqueous slurry with aluminum oxide (Al$_2$O$_3$) particles may be introduced into the skeletal preform. The aluminum oxide particle size may be chosen based on characteristics of the skeletal fiber preform (e.g., relative size of the fibers, component configuration of the skeletal preform, etc.) to enhance permeation of the slurry within skeletal preform. In many instances, a slurry having particles with a maximum dimension of in the range of about one to fifty microns (~1 µm-50 µm) are acceptable. The aqueous slurry is applied to the skeletal preform such that a percentage (e.g., 30%) of the total volume enclosed by the perimeter of the preform is filled by the particulate matter (e.g., Al$_2$O$_3$), but not all of the total volume. To fill the remaining void space of the now particle loaded preform, the aforesaid preform may be subjected to another vapor deposition process (e.g., CVD) to fill the remaining void space with SiC. A preform prepared in the manner described above may then be subject to additional steps known in the art to form the intended CMC substrate or component.

In this Example 1, the resultant SiC—Al$_2$O$_3$ composite has a CTE value of about 5.5 ppm/K, which is an increase relative to a SiC composite that would have a CTE value of about 5 ppm/K. The increase in CTE provided by the SiC—Al$_2$O$_3$ composite provides a better CTE match for an EBC with an outer layer of yttrium monosilicate (YSi$_2$O$_5$). The improvement in CTE matching mitigates thermal expansion in many thermal environments that would likely have otherwise created a mechanical deficit for a similar SiC CMC with an EBC of ($YSi_2O_5$).

Example 2

In this example, SiC fibers and $Al_2O_3$ fibers may be collectively used to make fiber tows. As stated above, the specific number of fibers in a tow may vary depending on characteristics of the desired tow and/or characteristics of the CMC component being produced. An SiC/$Al_2O_3$ tow may be formed that comprises 75% SiC fibers and 25% $Al_2O_3$ fibers; e.g., a 500 fiber SiC/$Al_2O_3$ tow using the aforesaid fiber percentages would include approximately 375 SiC fibers and 125 $Al_2O_3$ fibers. These SiC/$Al_2O_3$ tows may then be woven into plies. The processes described above in Example 1 may then be used to produce the prepared preform that then may be subjected to additional steps known in the art to form the intended CMC component. In this example, the amount of $Al_2O_3$ particles applied to the preform by the aqueous slurry is influenced by the volume fraction of $Al_2O_3$ present within the tows to achieve the total volume fraction of $Al_2O_3$ desired in the finished preform.

Example 3

In this example the processes described above in Example 1 are repeated, with the following change. In the example, the aqueous slurry contains $ZrO_2$-10$Y_2O_3$ particles in place of the $Al_2O_3$ particles described above. Like above, the $ZrO_2$-10$Y_2O_3$ particle size may be chosen based on characteristics of the skeletal fiber preform (e.g., relative size of the fibers, component configuration of the skeletal preform, etc.) to enhance permeation of the slurry within skeletal preform. The aqueous slurry with $ZrO_2$-10$Y_2O_3$ may be configured and applied so that the finished preform contains about 20% by volume of the $ZrO_2$-10$Y_2O_3$ particles.

In this Example 3, the resultant SiC—$ZrO_2$ composite has a CTE value of about 6.0 ppm/K, which is an increase relative to a SiC matrix which would have a CTE value of about 5 ppm/K. The increase in CTE provided by the SiC—$ZrO_2$ composite provides a better CTE match for an EBC with an outer layer of hafnium oxide ($HfO_2$). The improvement in CTE matching mitigates thermal expansion in many thermal environments that would likely have otherwise created a mechanical deficit for a similar SiC CMC with an EBC of ($YSi_2O_5$).

Example 4

In this example the processes described above in Example 2 are repeated, with the following change. In the example, the aqueous slurry contains $ZrO_2$-10$Y_2O_3$ particles in place of the $Al_2O_3$ particles described above. Like above, the $ZrO_2$-10$Y_2O_3$ particle size may be chosen based on characteristics of the skeletal fiber preform (e.g., relative size of the fibers, component configuration of the skeletal preform, etc.) to enhance permeation of the slurry within skeletal preform. The aqueous slurry with $ZrO_2$-10$Y_2O_3$ may be configured and applied so that the finished preform contains about 20% by volume of the $ZrO_2$-10$Y_2O_3$ particles. The present disclosure is not limited to any specific amount of $Y_2O_3$ within $ZrO_2$—$Y_2O_3$ mixtures.

Example 5

In this example, the processes and materials of Example 2 are repeated with the following change. $MoSi_2$ fibers (rather than $Al_2O_3$ fibers) are combined with the SiC fibers to collectively produce the fiber tows. As stated above, the specific number of fibers in a tow may vary depending on characteristics of the desired tow and/or characteristics of the CMC component being produced. A SiC/$MoSi_2$ tow may be formed that comprises 75% SiC fibers and 25% $MoSi_2$ fibers.

In these non-limiting examples, all of the percentages are volumetric percentages. The CTE increasing additives may be added by a variety of different methodologies; e.g., the CTE increasing additive(s) in particulate form may be added via a deposition technique such as chemical vapor infiltration ("CVI"). The CTE increasing additive(s) may be added in combination with or separate from the matrix materials.

The present disclosure is not limited to use with any particular EBC coating. Non-limiting examples of EBC coatings having utility with Si based CMC materials include rare-earth monosilicates such as $Y_2SiO_5$ (yttrium monosilicate), $Gd_2SiO_5$ (gadolinium monosilicate), $Er_2SiO_5$ (erbium monosilicate), $Yb_2SiO_5$ (ytterbium monosilicate), and $Lu_2SiO_5$ (lutetium disilicate) and $HfO_2$ (hafnium oxide).

As used in this specification and the appended claims, the singular forms "a," "an," and "the" include plural forms thereof unless the context clearly indicates otherwise. Unless otherwise indicated, all numbers expressing conditions, concentrations, dimensions, and so forth used in the specification and claims are to be understood as being modified in all instances by the term "about".

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially. Therefore, the particular order of the steps set forth in the description should not be construed as a limitation.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A ceramic matrix composite (CMC) material component, comprising: a CMC material comprising: a plurality of first fibers comprising a first material, the first material having a first coefficient of thermal expansion (CTE) value; a matrix incorporated with the plurality of fibers, the matrix comprising a second material having a second CTE value; and at least one CTE increasing additive having a third CTE value, the at least one CTE increasing additive incorporated into the plurality of first fibers; and an environmental barrier coating (EBC) disposed on at least one exposed surface of the CMC material, the EBC having a fourth CTE value; wherein the third CTE value is greater than the first CTE value and the second CTE value, and the at least one CTE increasing additive is present within the CMC material in an amount that elevates a CTE value of the CMC material above the first CTE value or the second CTE value.

2. The CMC material component of claim 1, wherein the at least one CTE increasing additive is provided as fibers, and the CTE increasing additive fibers are incorporated with the plurality of first fibers to produce a plurality of fiber tows and are incorporated into the CMC material.

3. The CMC material component of claim 2, wherein the at least one CTE increasing additive fibers are a first CTE increasing additive, and the at least one CTE increasing additive includes a second CTE increasing additive that is incorporated into the matrix.

4. The CMC material component of claim 3, wherein the second CTE increasing additive is incorporated into the matrix in particulate form.

5. A ceramic matrix composite (CMC) material component, comprising: a CMC material comprising: a plurality of first fibers comprising a first material, the first material having a first coefficient of thermal expansion (CTE) value; a matrix incorporated with the plurality of fibers, the matrix comprising a second material having a second CTE value; and at least one CTE increasing additive having a third CTE value, wherein the at least one CTE increasing additive comprises $ZrO_2$-$Y_2O_3$; and an environmental barrier coating (EBC) disposed on at least one exposed surface of the CMC material, the EBC having a fourth CTE value; wherein the third CTE value is greater than the first CTE value and the second CTE value, and the at least one CTE increasing additive is present within the CMC material in an amount that elevates a CTE value of the CMC material above the first CTE value or the second CTE value.

* * * * *